(No Model.)
W. H. PAYNE.
LIQUID MIXER, SHAKER, AND FRUIT SQUEEZER.
No. 528,688. Patented Nov. 6, 1894.
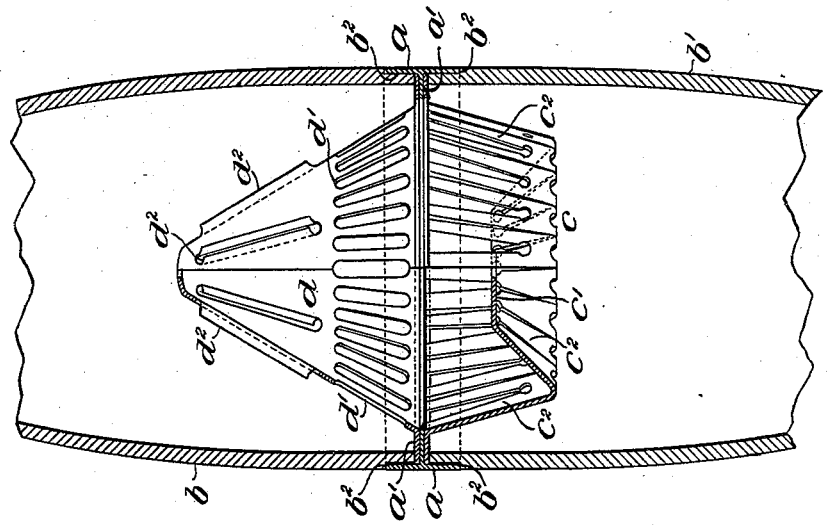
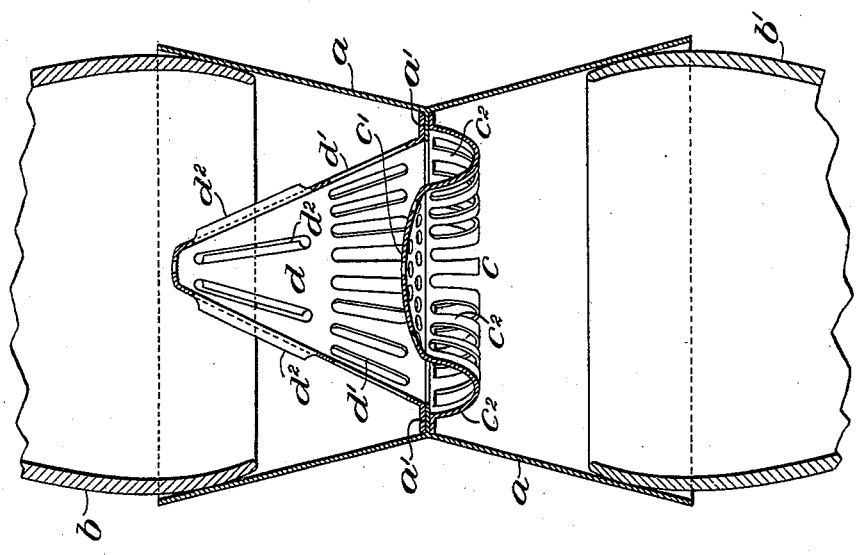
Witnesses:
Thomas M. Smith.
Richard C. Maxwell.
Inventor,
William H. Payne,
By J. Walter Douglass
Attorney.
THE NORRIS PETERS CO., PHOTO-LITHO., WASHINGTON, D. C.

UNITED STATES PATENT OFFICE.

WILLIAM H. PAYNE, OF PHILADELPHIA, PENNSYLVANIA, ASSIGNOR TO J. WALTER DOUGLASS, OF SAME PLACE.

LIQUID MIXER, SHAKER, AND FRUIT-SQUEEZER.

SPECIFICATION forming part of Letters Patent No. 528,688, dated November 6, 1894.

Application filed June 10, 1893. Renewed April 9, 1894. Serial No. 506,952. (No model.)

*To all whom it may concern:*

Be it known that I, WILLIAM H. PAYNE, a citizen of the United States, residing at the city of Philadelphia, in the county of Philadelphia and State of Pennsylvania, have invented certain new and useful Improvements in Liquid Mixers, Shakers, and Fruit-Squeezers, of which the following is a specification.

The principal objects of my invention are, first, to provide a simple, efficient, attractive, cleanly and comparatively inexpensive mixer or shaker; second, to provide such a device with reliable, durable and effective means for extracting the juice of fruit and the like and for separating the seeds and pulp therefrom; and third, to combine with such device a compact and inexpensive agitator and strainer for removing the solid ingredients of the beverage or decoction.

My invention stated in general terms consists of a mixer, shaker and fruit squeezer comprising a ring, annulus or collar adapted for the accommodation of the rims of two glasses or tumblers and provided on one surface with a slotted strainer and on the other surface with a ribbed or roughened and slotted fruit squeezer; and my invention further consists of the improvements hereinafter described and claimed.

The nature, characteristic features and scope of my invention will be more fully understood from the following description taken in connection with the accompanying drawings forming part hereof, and in which—

Figure 1, is a view partly in elevation and partly in section of a liquid mixer, shaker and fruit squeezer embodying features of my invention; and Fig. 2, is a vertical central section of the device of my invention in a slightly modified form in application to two glasses shown in section therein.

In the drawings, $a$ is a ring, annulus or collar internally flanged as at $a'$, and adapted to be fitted over and onto the rims of two glasses, vessels or tumblers $b$ and $b'$, in such manner that a tight joint or union is formed between them. In Fig. 1 of the drawings the rims of the glasses, vessels or tumblers are grooved or recessed as at $b^2$, for the accommodation of the ring, annulus or collar $a$, but these recesses may be dispensed with and glasses, vessels or tumblers having smooth rims may be employed as illustrated in Fig. 2.

$c$, is a slotted and perforated strainer comprising in the present instance a disk $c'$, provided with radial arms $c^2$, attached to the flange $a'$, and bent in such manner that the strainer is of the form of a truncated cone having one of its bases, the disk $c'$, located comparatively near its other base, the flange $a'$, as shown in the drawings.

$d$, is a conical roughened fruit squeezer attached to the flange $a'$, and located on the surface thereof opposite the strainer $c$. In the present instance this conical squeezer $d$, is slotted as at $d'$, and the required roughened surface is provided by turning up the edges of certain of these slots as illustrated at $d^2$.

The mode of operation of the hereinabove described liquid mixer, shaker and fruit squeezer is as follows:

In use, sugar, ice, liquor or any other ingredients of the beverage, except lemon or fruit juice, in their proper proportions are placed in the glass, vessel or tumbler $b'$. The ring, annulus or collar $a$, is then fitted snugly onto the rim of the glass, vessel or tumbler $b'$, with the squeezer $d$, projecting upward. A portion of a lemon or other fruit is then placed over the squeezer $d$, and turned or rubbed thereon. Under such action the juice of the fruit is extracted and flows through the slots $d'$, into the glass, vessel or tumbler $b'$, and the pulp, seeds and other matter remain upon the exterior surface of the squeezer from which such may be readily removed. The glass, vessel or tumbler $b$, is then fitted snugly into the ring, annulus or collar $a$, in the manner illustrated in the drawings and the contents of the glasses, vessels or tumblers are shaken or agitated in the usual manner. During this operation the strainer $c$, confines the ice and other solid material in the glass, vessel or tumbler $b'$, and permits the liquid to flow through the openings $c^3$, therein and also through the slots $d'$, of the squeezer back and forth from one glass, vessel or tumbler into the other, so that the strainer $c$, constitutes in effect an agitator and insures the thorough mixing of the ingredients of the beverage or decoction. When the beverage is thoroughly agitated the liquid portion thereof is permitted to collect in the glass, vessel or tumbler $b'$, and the glass, vessel or tumbler $b$, is then detached from the ring, collar or annulus $a$, and the liquid is poured out for use from the glass, vessel or tumbler $b'$, into the glass, vessel or tumbler or into any suitable drinking glass $b$, through the strainer $c$, and squeezer $d$, so that all of the solid matter and ice are detained in the tumbler, vessel or glass $b'$. In this connection it may be remarked that the ring, annulus or collar $a$, and its accessories may be made of metal and consequently may be readily kept clean.

It will be obvious to those skilled in the art to which my invention appertains that modifications may be made in details without departing from the spirit of my invention and hence I do not wish to limit myself to the precise construction and arrangement of parts herein explained and illustrated in the drawings.

Having thus described the nature and objects of my invention, what I claim as new, and desire to secure by Letters Patent, is—

1. A mixer, shaker and fruit-squeezer, comprising a ring, annulus or collar for accommodating the rims of two glasses, vessels or tumblers and provided on one side with a slotted and perforated truncated cone-shaped strainer and on the other side with a ribbed or roughened and slotted cone-shaped fruit squeezer, substantially as and for the purposes set forth.

2. A mixer, shaker and fruit-squeezer, comprising a ring, annulus or collar for accommodating the rims of two glasses, vessels or tumblers and provided with an inwardly projecting rib, a conical-shaped slotted and roughened squeezer connected with said rib and a disk provided with radial-arms attached to said rib and bent to form a strainer, substantially as and for the purposes set forth.

3. A liquid mixer and fruit squeezer having a ring or annulus provided with inversely flaring rims for accommodating two glasses, vessels or tumblers and provided with a cone-shaped slotted and roughened squeezer and a perforated disk provided with radial arms bent to form a strainer, substantially as and for the purposes set forth.

4. A liquid mixer and fruit squeezer provided with an internally flanged ring, annulus or collar for the reception of two vessels, glasses or tumblers and a cone-shaped roughened and perforated fruit squeezer integral with the flange of the ring, annulus or collar, and a perforated strainer integral with said flange and provided with radial arms forming a truncated cone having one of its bases near to the other, substantially as and for the purposes set forth.

5. A mixer and squeezer provided with a ring, annulus or collar for the rims of two glasses, vessels or tumblers and provided with an inwardly projecting flange carrying a cone-shaped slotted fruit squeezer having certain of the edges of the slotted portion thereof turned up, substantially as and for the purposes set forth.

6. A liquid mixer and fruit squeezer having a ring, annulus or collar provided with an integral raised perforated base, and a series of slotted radial arms integral therewith and forming a strainer, substantially as and for the purposes set forth.

7. A liquid mixer and fruit squeezer provided with a ring, annulus or collar for the rims of two glasses, vessels or tumblers and provided with an inwardly projecting flange having a perforated cone-shaped squeezer with flaring edges and a perforated and slotted strainer with a dish-shaped internal body, substantially as and for the purposes set forth.

In testimony whereof I have hereunto set my signature in the presence of two subscribing witnesses.

WILLIAM H. PAYNE.

Witnesses:
THOMAS M. SMITH,
RICHARD C. MAXWELL.